UNITED STATES PATENT OFFICE.

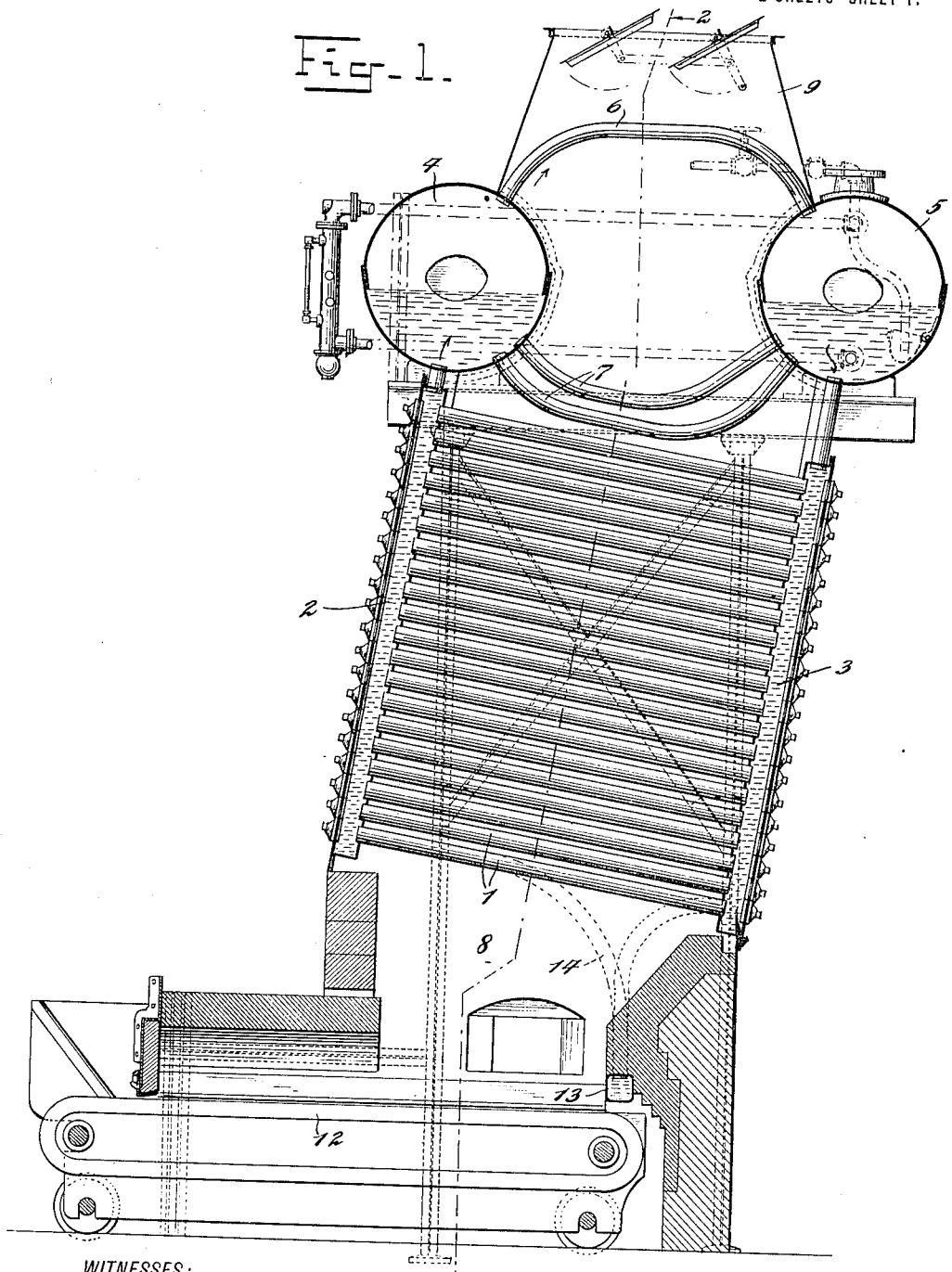

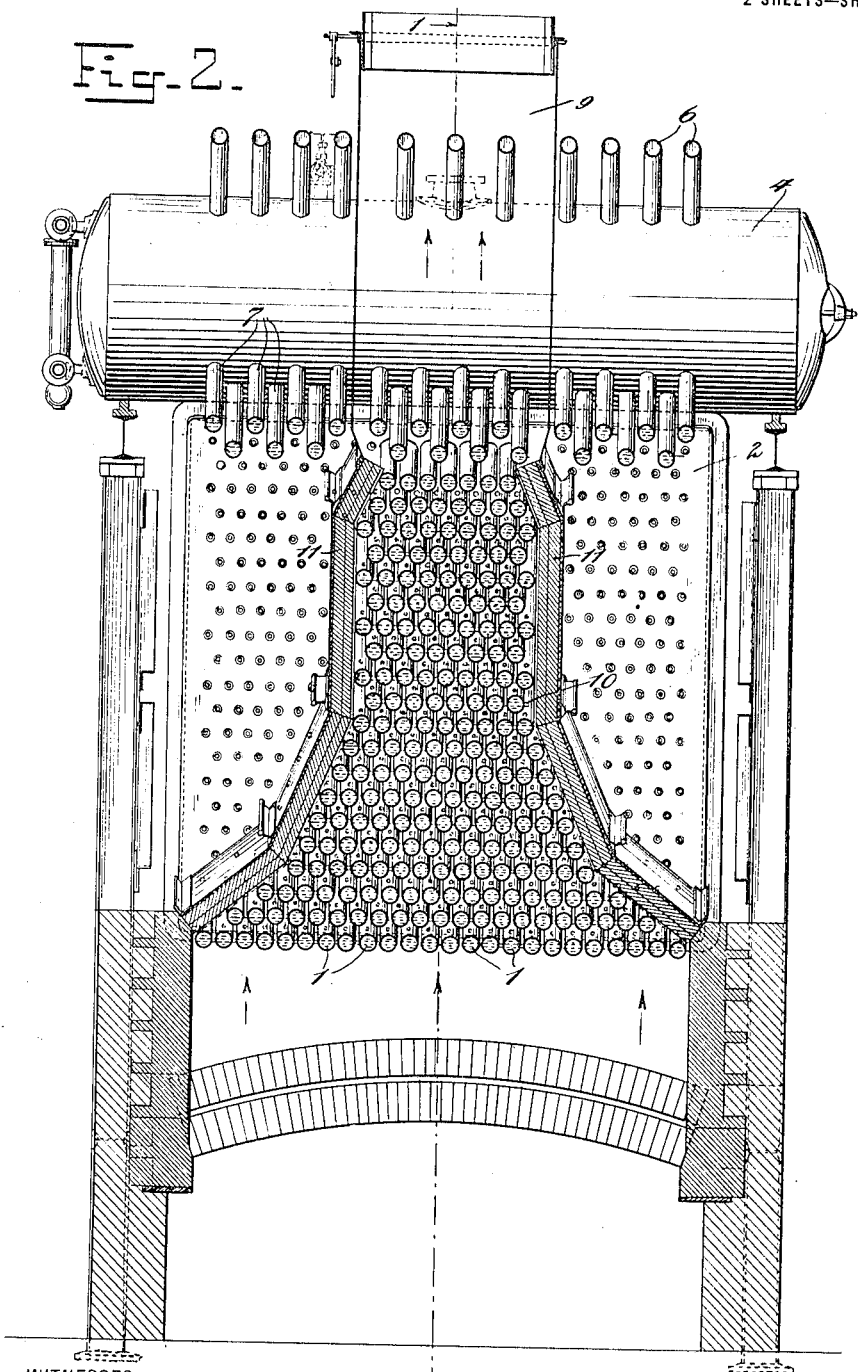

ISAAC HARTER, JR., OF NEW YORK, N. Y., ASSIGNOR TO THE BABCOCK & WILCOX COMPANY, OF BAYONNE, NEW JERSEY, A CORPORATION OF NEW JERSEY.

STEAM-BOILER.

1,280,996.

Specification of Letters Patent.

Patented Oct. 8, 1918.

Application filed October 13, 1915. Serial No. 55,625.

*To all whom it may concern:*

Be it known that I, ISAAC HARTER, Jr., a citizen of the United States, residing at New York city, borough of Richmond, county of Richmond, and State of New York, have invented certain new and useful Improvements in Steam-Boilers, of which the following is a specification.

The efficiencies and capacities of steam boilers are dependent upon the quantity of gas passing through the boiler and the degree of its contact with the heating surface. The limiting elements in the matter of quantity are the cost and complication of high draft losses, and in order to get a satisfactory degree of contact between the heating surface and the gases it has been customary to use baffles.

In using such baffles to make the gases travel across or along the tubes the gases are made to change their path of travel, with the result that there is an additional draft loss due to the sudden changes in the direction of the flow of the gases. My invention eliminates losses due to these sudden changes in the direction of the path of the gases, and yet provides the means for producing and maintaining any desired velocity of the gases throughout the heating surface, and a highly uniform distribution over the heating surface, or through the flow space, so that a high absorptive efficiency can be secured and at the same time the saving of the draft loss due to the baffles can be applied to secure a greater capacity and a more uniform distribution of the gases.

In absorbing heat from the hot gases generated in a furnace there are two elements to be considered: first: the absorption of the radiant heat, and second: the absorption of the heat imparted to the gases. To effectively absorb the radiant heat a large amount of the surface should be exposed to the direct action of the fire. The elimination of the baffles leads to this result directly. To secure the best results in absorbing the heat imparted to the gases, which is effected through the conduction of the heat from the gases to the boiler tubes, the gases must impinge on the tubes with a proper velocity and all parts of the tube surface must be uniformly subjected to the gas flow.

It has been found that the heat transfer rate, or the amount of heat absorbed by conduction, is greater at a high velocity of the gases than at a low velocity. In an ordinary boiler, where the tube spacing, the distance between the tubes and the tube lengths are uniform throughout the boiler, the velocity of the gases is much lower on passing over the last tubes than it is on passing over the first tubes on account of the increase in density of the gases as they decrease in temperature. While it may be possible by baffle arrangement to approximate the high velocity conditions throughout the boiler that my invention secures, this can only be done with a draft loss which loss my invention reduces or eliminates. However, in boilers as constructed, it will be found that the velocity of the gases over the last tubes is actually much less than in the remainder of the boiler and consequently the heat absorption of the last tubes is considerably handicapped.

In my invention I arrange the boiler tubes so that the area for the passage of the gases at successive rows of tubes decreases by decreasing the space between the inclosing walls which extend lengthwise of the tubes, and correspondingly decreasing the number of tubes in the successive rows. I may, and preferably do, use tubes of the same length and diameter and space them the same distance apart. In this way, as the gas flows through the boiler, I maintain a velocity of the gases over the tube surface which leads to the best commercial efficiency when the draft loss and capacity obtainable are considered. By reason of this successive decrease in area there is a small increment of draft loss with each successive reduction, and this small increment causes the gases to spread out uniformly over the whole heating surface, or through the flow space, and avoids any tendency to the laning action of the gases.

In my invention the travel of the gases through the boiler is in the same general direction, and with no return of the gases to and over a portion of the same tubes, and in addition to saving the draft loss that is required to make the turns in an ordinary boiler there is an additional gain from the fact that in an ordinary boiler, at the point where these turns take place, there is a tendency to divert the gases from the surface adjacent to this point.

The invention will be understood by reference to the accompanying drawings in which Figure 1 is a vertical longitudinal section through one form of boiler embodying the invention on the plane of the line 1—1 of Fig. 2; and Fig. 2 a vertical transverse section on the plane of the line 2—2 of Fig. 1.

Similar reference numerals indicate similar parts in the several views.

In the drawings the numeral 1 designates a bank of inclined generating tubes expanded into front and rear water legs 2 and 3, common to all the tubes, these legs being nippled to transverse steam and water drums 4 and 5, respectively. The drums are connected by steam and water circulators 6 and 7 and are shown as supported at substantially the same level. The generating surfaces are shown as placed so that the tubes are directly above the main combustion chamber 8 (a stoker-fired furnace being shown), and so that the lower tubes are exposed to the direct action of the fire. As baffles are not employed the gases have an unobstructed flow across the tubes, to the uptake 9.

In this boiler the tubes are preferably staggered and of the same length, and spaced the same distance apart. In the form shown, in order to secure the desired velocity of the gases in their passage to the uptake, I have decreased the number of tubes in each row from the lowermost, which contains the maximum number, to a point substantially midway of the height of the bank. That is to say, from the lowermost row to the row 10 each successive row contains one or two tubes less than that immediately below it. The side walls 11 extend from substantially the lowermost tubes upwardly and inwardly to substantially the row of tubes 10, and thence upwardly in a vertical direction for some distance, then inwardly and upwardly to the uptake. The curve of the drop in temperature of the gases is somewhat imitated by this arrangement of the side walls. Above the tenth row, as here indicated, there are nine and eight tubes in the alternate rows until near the upper rows when there is another reduction in the number of tubes immediately below the inlet to the uptake.

I have shown a chain grate stoker 12 but the particular method of firing is not an essential part of the invention, as it is obvious that other forms of stokers may be employed. I have shown in connection with the chain grate stoker a water box 13 at the rear of the stoker. This box may be connected with the circulation through tubes 14.

In the boiler herein illustrated and described a large amount of heating surface is exposed to the radiant heat of the fire, thus absorbing a greater amount of heat by direct radiation than would be absorbed when only a portion of the tubes is thus exposed. By presenting a large amount of heating surface to the direct action of the fire there is an advantage through minimizing the expense of maintenance of brickwork by reducing the temperature of the furnace. In certain instances a reduction of furnace temperature makes it possible to burn fuels which would give trouble through fusing the ash with higher furnace temperatures, and in such cases a large amount of the boiler surface exposed to the radiant heat is of especial advantage. Where the furnace temperature is such that the ash of the coal is fused, the fire with certain grades of coal will become more or less impervious to air, and in some instances the rate of combustion will be so low through this cause that the proper degree of capacity cannot be obtained from the boiler. In my arrangement this difficulty is overcome by reducing the furnace temperature, and it is possible to burn fuels which would give trouble with some other arrangements.

Another advantage of my arrangement is, that in cleaning the dust from the outside of the tubes, which is usually accomplished by means of an air or steam lance with the boiler in operation, the dust will be carried well away from the setting, as the velocity of the gases may be maintained at a point where the dust will be carried along with the gases as they flow through the boiler.

I have described in this application one method to effect the decrease of the area for the flow of the gases, so as to maintain any desired velocity of the gases. This velocity may be maintained substantially constant, if desired. In some cases good results would be secured by maintaining a nearly equal and high speed of the gases over the greater part of the boiler, and arranging the tubes which come nearest the fire with a wider spacing than this rule would call for.

It is not necessary that the increase of velocity bear an exact ratio to the decrease in the area at each successive row of tubes. It is to be understood that I do not limit myself to the exact number of tubes in each row, as shown in the drawings, the latter serving simply to explain the principle upon which the invention is based.

What I claim and desire to secure by Letters Patent of the United States is:—

A water tube boiler comprising a bank of generating tubes arranged in parallel rows at substantially equal distances apart and with the tubes of a given row staggered with respect to the tubes of adjacent rows, the number of tubes in the rows decreasing from the lowermost row toward the offtake flue, front and rear water legs to which the opposite ends of all of the tubes are connected, side walls from the front to the rear water legs and conforming to the general form of the bank of tubes so as to cause the gases to flow through the boiler in one direction through a single decreasing flow area unobstructed by baffling, and drums connected to said water legs, said offtake flue being between said drums.

In testimony whereof I have hereunto signed my name in the presence of two subscribing witnesses.

ISAAC HARTER, JR.

Witnesses:
JOHN H. CRONAN,
EDWARD A. BANNON.